Oct. 14, 1947.  G. H. EVANS  2,428,792
ILLUMINATION SYSTEM
Filed June 28, 1945
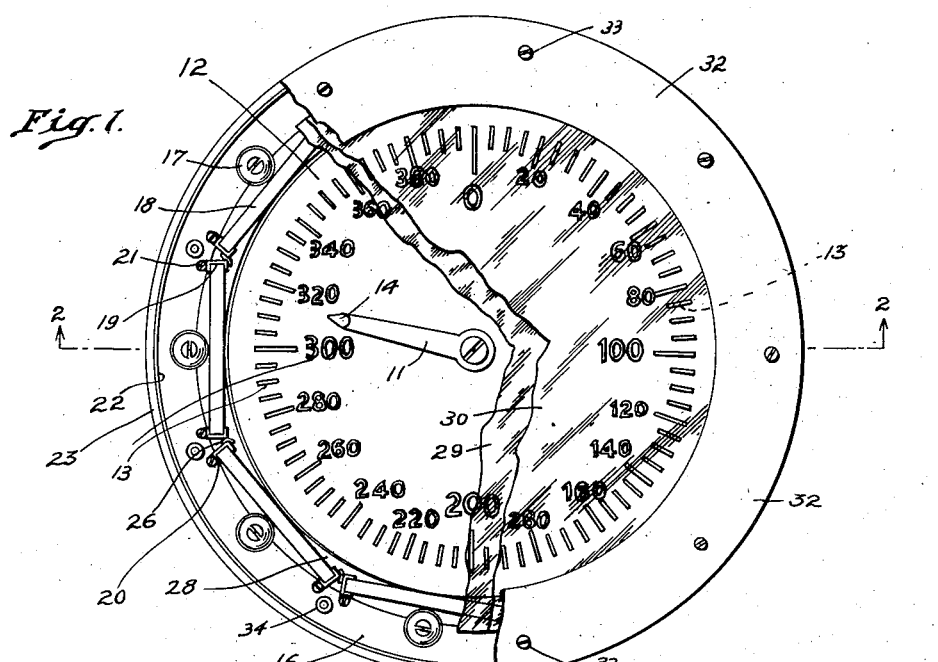
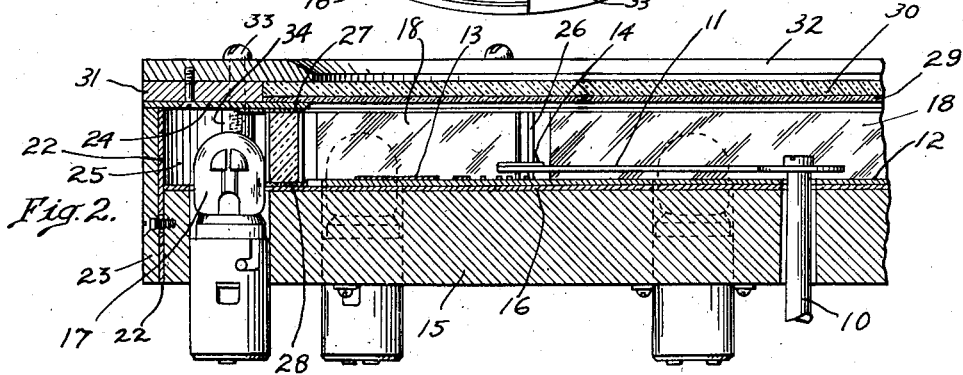
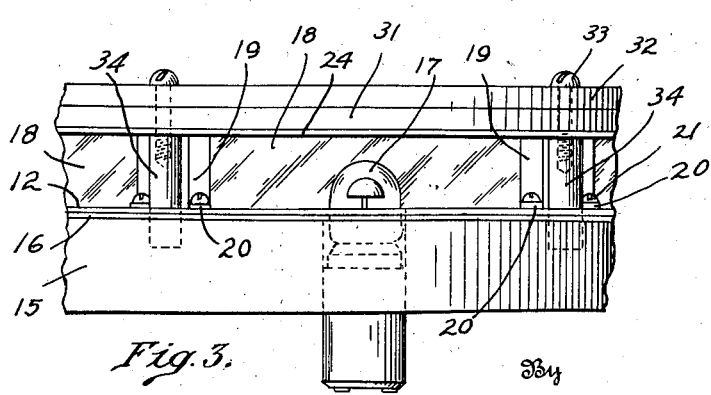
Inventor
GEORGE H. EVANS
By M. C. Hayes
Attorney Patented Oct. 14, 1947

2,428,792

UNITED STATES PATENT OFFICE 2,428,792

ILLUMINATION SYSTEM

George H. Evans, Washington, D. C.

Application June 28, 1945, Serial No. 602,144

1 Claim. (Cl. 250—72)

(Granted under the act of March 3, 1883, as amended April 30, 1928; 370 O. G. 757)

The present invention relates to illuminated indicators particularly such as must be readily observable by daylight illumination and at night by artificial illumination without detriment to the observer's darkness adaptation. The invention is therefore of special utility in the indicating instruments of moving vehicles such as ships, airplanes, automobiles and the like, where the user's vision must be directed alternately to the instrument and to an outside field of observation highly illuminated at day and poorly illuminated at night. To this end it is desirable that the indicia have good daylight reflecting qualities to compete in visibility with the highly illuminated outside field, and that at night just those elements indispensable to the reading of the indicator such as indicia and a pointer or selected portion of the latter cooperating with the indicia, be softly but distinctly illuminated against a dark background and without glare or unwanted reflections of any kind from such background.

The invention seeks as its main object the provision of an illuminating system for indicators in which the aforesaid desired qualities are attained in high degree.

An important object is the provision of an indicating instrument in which the above mentioned qualities are attained through an extremely simple and sturdy cooperative combination and arrangement of elements requiring a minimum of highly skilled mechanical workmanship and a minimum of operations in its construction, and in which the operation in use depends mainly upon the characteristics and qualities of the material from which the elements are formed and the cooperative arrangement of such elements, rather than critical form, dimension and mechanical relation.

Various other objects and advantages of the invention will become apparent from a perusal of the following specification and the drawings accompanying the same.

In the drawings:

Fig. 1 is a top plan view of an indicator dial structure embodying the invention, showing a portion of the cover broken away.

Fig. 2 is a portion of a section on the line 2—2 of Fig. 1, on an enlarged scale.

Fig. 3 is a fragmentary side view looking from the left of Fig. 2 with the side wall elements removed.

Referring to the drawings in detail, these show the dial and pointer structure of an indicating instrument in which the indicator shaft 10 of a speed indicator or other responsive device not shown, carries a pointer arm 11 arranged to sweep over a dial 12 having a dark colored non-fluorescent surface bearing indicia 13 of fluorescent material. Preferably the pointer arm 11 also has a black or dark colored non-fluorescent surface and carries a pointer element 14 of fluorescent material. Thus is avoided the presence of relatively brightly illuminated areas other than those necessarily visible for a reading of the indicating instrument. Preferably the fluorescent material of both the indicia and the pointer element is one which is normally of a substantially yellow color of high visibility and which fluoresces a similar yellow color upon excitation of ultra-violet light. In the present embodiment of the invention the fluorescent material is normally a bright yellow color of high visibility which upon excitation by ultra-violet light fluoresces a bright yellow very similar to the normal color but appearing to be a little nearer the orange in very slight degree. A circular base member 15 preferably of light material such as wood, compressed fiber, or plastic material covered with a sheet 16 of metal, supports the dial 12.

A source of ultra-violet light for excitation of the fluorescent material of the indicia and pointer element is provided in the form of a series of ultra-violet argon electric bulbs 17 and ultra-violet transmitting filter elements 18 mounted on the base member 15 around the outer edge of the dial. These filter elements 18 are held in place by the end supports 19 secured to the base member 15 by laterally extending lugs 20 and screws 21. An annular sheet metal band 22 and annular side wall casing element 23 form the outer side wall of the dial casing, and with the outer marginal portion of the base cover-sheet 16 and an annular sheet metal reflecting ring 24, form an annular inwardly-facing reflector trough 25 for the circular arrangement of lamps 17. To enhance the reflecting efficiency of the light trough the sheet material from which the base covering 16, annular band 22 and ring reflector 24 are formed, is preferably aluminum or an aluminum alloy with a highly polished surface on the side next the light, which material has bene found to be of relatively high efficiency in reflection of ultra-violet light. The lamps 17 are housed within a continuous annular reflecting trough 22 extending around the periphery of the dial and facing inwardly toward the dial with a substantially annular, filter wall between the open end of the trough and the dial and pointer to be illuminated. Inasmuch as only the outer marginal portion of the base covering 16 beyond the periphery of the dial functions as the bottom reflecting wall of the reflector trough 25, it may be replaced by a ring of polished sheet metal like the top ring 24 placed around the periphery of the dial. It will be obvious that instead of the circular array of straight filter sections 18, the filter may be formed of a continuous strip of plastic material bent into a continuous annulus. It will also be obvious that in substitution for the argon lamps 17, other light sources rich in ultra-violet and performing an equivalent function in the combination may be used, such as mercury vapor lamps or high-temperature metallic filament lamps. For light-proofing of the joints between the ends of filter elements 18 suitable soft packing material such as the pieces of felt 26 may be placed between the adjacent edges of the filter end supports 19. For light-proofing the joints at top and bottom of the filter elements, light-proofing rings 27 and 28 of soft felt or other suitable material are provided. Thus all light passing from the bulbs 17 and the reflecting walls of the trough 25 to the fluorescent indicia and pointer element must pass through the filter elements 18 which later operate to cut off most of the visible light.

To protect an observer's eyes from direct or reflected ultra-violet radiation which would produce the effect of a haze in the field of vision due to slight fluorescence within the eyes, a ray-filter cover 29 is mounted over the dial in overlapping relation with the inner marginal portion of the ring reflector 24. This filter cover is of clear plastic material of a yellow color which will pass both the normal yellow color and the fluorescent yellow color of the indicia and pointer elements, and cut off ultra-violet and substantially all of any visible violet or low blue that might be passed by the filter elements 18. This type of yellow filter serves the additional function of protecting the fluorescent material from the ultra-violet rays of the sun which have been found to accelerate the decay of fluorescent paints.

The dial has a mat surface dark in color preferably black and non-fluorescent. This surface quality is obtained by the use of a suitable coating of paint or the like. It also may be obtained by forming the dial of a dark colored material with a mat surface. The dial being non-fluorescent, any light passing therefrom toward the observer can be only such little as might be reflected from the mat surface of the dial and this being originally only that small amount of visible violet or low blue as may be passed by the filter, will be effectively blocked off by the yellow cover filter 29. A clear colorless cover glass 30 covers the filter-window element 29 and with the spacing ring 31 between the top reflecting ring 24 and the bezel ring 32. This cover assemblage is held together by suitable screws 33 passing through the top reflecting ring 24 and spacing ring 3 into the bezel ring 32. The cover assemblage as a unit is clamped onto the dial casing through the cap screws 33 threaded into mounting posts 34 carried on the base member 15. It will be obvious that the cover glass 30 may be formed from a filter glass having the qualities of the color filter 29 thus rendering the use of a separate filter element unnecessary and further improving the simplicity and sturdiness of the device. In the embodiment here shown, the thin sheet filter element 29 is of yellow "Plexiglas." However, with either the glass filter or sheet plastic cover filter, the mounting of the light source 17 substantially midway between the plane of the dial and the plane of the filter cover and close to the edge of the dial and bezel opening to permit a compact assemblage, will not result in undue loss of radiant energy through the cover because a large portion of the light striking the bottom surface of the cover filter will be reflected back onto the dial. This alone would have the disadvantage that a considerable portion of the rays not reflected would pass through the bezel opening to annoy the observer either as glare or by producing an apparent haze due to fluorescence of the eye if it were not for the entrance of the cover filter into the combination whereby substantially all of the rays from the source striking the filter and not reflected are absorbed or blocked by the filter.

The invention described herein may be manufactured and used by or for the Government of the United States of America for governmental purposes without the payment of any royalties thereon or therefor.

What is claimed is:

In an illuminated indicating instrument, a substantially non-fluorescent dial, indicia of fluorescent material and a pointer element therefor of fluorescent material, said fluorescent material fluorescing to a given color under excitation by ultra-violet and visible light near the ultra-violet, a source of light rich in both ultra-violet and light near the ultra-violet situated in front of the assemblage of dial indicia and pointer for supplying radiant energy to said fluorescent material, a filter situated between the source and the dial passing ultra-violet and visible light near the ultra-violet, and a filter-cover passing undiminished said given fluorescent color but cutting off substantially all the visible light near the ultra-violet passed by said first filter, and said filter-cover being situated in front of the entire assemblage.

GEORGE H. EVANS.

REFERENCES CITED

The following references are of record in the file of this patent:

UNITED STATES PATENTS

| Number | Name | Date |
| --- | --- | --- |
| 1,951,783 | Beard | Mar. 20, 1934 |
| 2,347,671 | Dircksen | May 2, 1944 |
| 2,347,672 | Dircksen | May 2, 1944 |
| 2,337,745 | Garstand | Dec. 28, 1943 |
| 2,029,348 | Denburg | Feb. 4, 1936 |
| 2,139,707 | Denburg | Dec. 13, 1938 |
| 1,955,173 | Chambers | Apr. 17, 1934 |
| 2,311,492 | Michaelis | Oct. 12, 1943 |
| 2,336,560 | Michaelis | Dec. 14, 1943 |
| 2,310,743 | Moss | Feb. 9, 1943 |

FOREIGN PATENTS

| Number | Country | Date |
| --- | --- | --- |
| 426,789 | Great Britain | Apr. 5, 1935 |
| 426,797 | Great Britain | Apr. 10, 1935 |
| 507,037 | Great Britain | June 8, 1939 |
| 450,513 | Great Britain | July 15, 1936 |